United States Patent [19]

Barnett et al.

[11] Patent Number: 4,800,432

[45] Date of Patent: Jan. 24, 1989

[54] VIDEO DIFFERENCE KEY GENERATOR

[75] Inventors: Ronnie D. Barnett, Nevada City; Steven M. Parkes, Davis, both of Calif.

[73] Assignee: The Grass Valley Group, Inc., Grass Valley, Calif.

[21] Appl. No.: 922,976

[22] Filed: Oct. 24, 1986

[51] Int. Cl.[4] .................... H04N 5/14; H04N 5/275; H04N 9/75

[52] U.S. Cl. .................................. 358/160; 358/22; 358/136; 358/183

[58] Field of Search ................ 358/22, 160, 183, 136

[56] References Cited

U.S. PATENT DOCUMENTS

| 4,160,994 | 7/1979 | Mendrala | 358/22 |
| 4,562,466 | 12/1985 | Clapp et al. | 358/136 |
| 4,568,981 | 2/1986 | Beaulier | 358/183 |
| 4,621,280 | 11/1986 | Shinohara et al. | 358/183 |
| 4,667,233 | 5/1987 | Furukawa | 358/136 |

Primary Examiner—James J. Groody
Assistant Examiner—Michael D. Parker
Attorney, Agent, or Firm—Francis I. Gray

[57] ABSTRACT

A video difference key generator has a stored reference video image. An input video image is compared with the reference video image by an absolute difference circuit which substracts corresponding pixels of the two video images, the smaller from the larger, to produce a difference video image. The difference video image may be filtered, and then is input to a transfer function circuit to produce an output which may be used as a key signal for compositing video images.

5 Claims, 1 Drawing Sheet

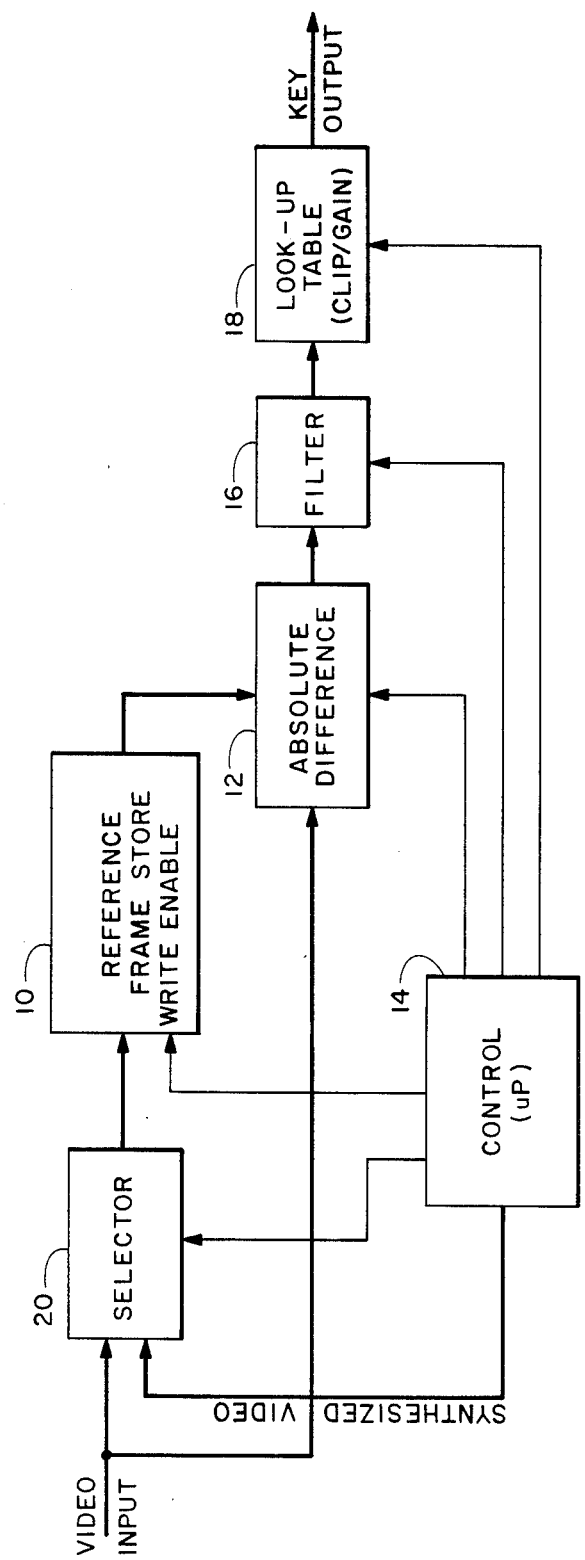

VIDEO DIFFERENCE KEY GENERATOR

BACKGROUND OF THE INVENTION

The present invention is related to key generators for video processors, and more particularly to a video difference key generator which compares a reference video image to an input video image and computes the absolute differences between images on a pixel by pixel basis.

In television production it is common to combine two video signals in such a manner that a portion of a scene represented by one of the video signals appears in the foreground superimposed over a background scene formed from the other video signal. This is done by generating a key signal which determines, for each pixel of the scene represented by the foreground video signal, whether the foreground scene is displayed without attenuation in the composite of the two video signals or should be replaced at least partially by the corresponding pixel from the background scene. Such a key signal is commonly generated from the color components of the foreground video signal by forming the foreground signal while the foreground subject appears against a backing screen of uniform color selected from colors which do not appear in the foreground subject, i.e., generally a saturated shade of blue. For each pixel of the foreground scene corresponding to the color of the backing screen a key signal of one is generated, and for each pixel of the foreground subject which is not the color of the backing screen a key signal of zero is generated. The transition of the key signal from one to zero may be blurred so that the transition is not abrupt, and the key signal will have a value between one and zero. The key signal is then multiplied with the background scene and one minus the key signal is multiplied with foreground scene, and the resulting multiplicands are summed to produce the composite video output. In some recent digital systems the key signal is a digital signal having a number of bits, such as eight, to encompass transition values or to create effects where the foreground scene is semitransparent.

U.S. Pat. No. 4,485,403 issued Nov. 27, 1984 to Gerhard Illetschko entitled "Noise Reduction System for Television Signals" and U.S. Pat. No. 4,549,213 issued Oct. 22, 1985 to Gerhard Illetschko entitled "System for Reduction of Noise in a Television Signal" describe a motion detector which compares consecutive frames of a video picture to detect when there is motion within the picture. This output generates a signal which is used to control the amount of noise reduction applied to a video picture. With additional circuitry this output could be used to generate a key signal for compositing. Other types of key signals may be generated for recursive effects or the like by operator control. Each key generation circuit requires a separate circuit depending upon the key application. What is desired is a key generator which may be used to generate any desired type of key including a traditional chroma key.

SUMMARY OF THE INVENTION

Accordingly the present invention provides a video difference key generator which stores a reference video image in a digital frame store or synthesizes the reference video image under user control. The reference video image is compared with an input video image and the absolute difference on a pixel by pixel basis is determined. The difference video image is processed with a look-up table which can emulate conventional clip and gain circuitry to provide threshold levels and edge softness as well as many non-conventional transfer functions. The reference video image may be any desired video image, such as a black frame to generate luminance keys, a pure color frame to generate chroma keys, a prior frame of the picture video to generate motion keys, a key frame to compare with incoming keys or the like. The resulting output is a key signal which can be used in the compositing of video images.

The objects, advantages and other novel features of the present invention will be apparent from the following detailed description when read in conjunction with the appended claims and attached drawing.

BRIEF DESCRIPTION OF THE DRAWING

The FIGURE is a block diagram of a video difference key generator according to the present invention.

DESCRIPTION OF THE PREFERRED EMBODIMENT

Referring now to the FIGURE an input selector 20 under user control selects either an input video image or a synthesized video image, such as a black video image, a pure color video image, etc., to be applied to a reference frame store 10. The input video image is also applied to an absolute difference circuit 12. A control circuit 14, which may be a microprocessor, determines whether the selector 20 output video image, stored as a reference video image in the reference frame store 10, is the input video image or the synthesized video image generated by the control circuit. The reference video image from the reference frame store 10 is compared with the input video image in the absolute difference circuit 12 to output a difference video signal which represents the difference in absolute value between respective pixels of the reference video image and the input video image. The control circuit 14 may enable the difference circuit 12 to compare only luminance data, only chrominance data, only key data or any combination of these components of the input video image. The difference video signal is then applied to an optional filter circuit 16, the parameters of which are controlled by appropriate signals from the control circuit 14 as is well known in the art. Filtering provides the ability to ram sharp edges and reduce noise spikes in the difference video signal according to the parameters of the filter 16 as determined by the control circuit 14. Finally the key signal is passed through a look-up table ROM 18 which provides a transfer function. The look-up function from the table 18 is executed under control of the control circuit 14 and may emulate a conventional clip and gain circuit to produce a key output. The control circuit 14 may vary the values of clip and gain in the look-up table 18 to provide thresholding and softness of the difference video signal, or may further modify the key output to provide, for instance, bands of absolute difference. The resulting key output may be used as a key signal in the compositing of video images.

The reference video image stored in the reference frame store 10 may be a frame of video black. An input video image is compared with the stored reference video image and the difference is the luminance level of the input video image. Alternatively a color may be stored in the reference frame store 10 and compared with the chrominance components of the input video image to obtain a type of chroma key. Further the reference video image may be any other type of video image including synthesized patterns or a frame of the video picture input. The result is a flexible, single key generator for generating any type of key within the imagination of an operator depending upon the selected reference signal and the control signals from the control circuit 14.

Thus the present invention provides a video difference key generator having a reference video image stored in a frame store for comparison with an input video image to generate a key output which may be used as a key signal for compositing video images, the type of key being a function of the stored reference video image and the control signals from a control circuit.

What is claimed is:

1. A video difference key generator comprising:
   means for storing a predetermined reference video image;
   means for enabling the storing means to receive the reference video image, the reference video image being provided via an input selector; and
   means for comparing the reference video image from the storing means with an input video image from an input bus to produce a desired key output.

2. A video difference key generator as recited in claim 1 further comprising means for applying a controllable transfer function to the output of the comparing means to produce the key output.

3. A video difference key generator as recited in claim 2 further comprising means for filtering the output of the comparing means prior to input to the applying means.

4. A video difference key generator as recited in claim 1 further comprising means for switching the output of the input selector between the input video image or an input synthesized video image from the enabling means.

5. A video difference key generator as recited in claim 4 wherein the enabling means comprises a microprocessor control circuit which generates the synthesized video image, a write enable command to enable the storing means to receive the reference video image, and control signals for the comparing and filtering means.

* * * * *